United States Patent [19]

Troiano

[11] Patent Number: 5,914,869
[45] Date of Patent: Jun. 22, 1999

[54] AC/DC TRANSFORMERLESS VOLTAGE CONVERTER

[75] Inventor: Anthony Troiano, Princeton Junction, N.J.

[73] Assignee: General Instrument Corporation, Horsham, Pa.

[21] Appl. No.: 08/929,714

[22] Filed: Sep. 15, 1997

[51] Int. Cl.[6] .................................................. H02M 3/18
[52] U.S. Cl. .......................... 363/61; 320/128; 307/110
[58] Field of Search ............................. 320/128, 166; 307/109, 110; 363/56, 60, 61

[56] References Cited

U.S. PATENT DOCUMENTS 4,882,665 11/1989 Choi et al. .................................. 363/60
5,187,421 2/1993 Naito ........................................... 363/59
5,446,644 8/1995 Zhon ........................................... 363/62

*Primary Examiner*—Shawn Riley
*Attorney, Agent, or Firm*—Volpe and Koenig, P.C.

[57] ABSTRACT

A voltage converter transforms a high voltage alternating current (ac) input source into a lower voltage direct current (dc) output voltage. The line frequency of the ac current switches an electronic switch to alternately reconfigure a combination of capacitors and diodes to perform energy storage and effect voltage division. The dc output voltage is approximately one half of the peak ac input voltage at no load.

23 Claims, 6 Drawing Sheets

5,914,869

1

AC/DC TRANSFORMERLESS VOLTAGE CONVERTER

BACKGROUND OF THE INVENTION

1. Field of the Invention

The present invention relates to devices for transforming voltage. In particular, the present invention pertains to an electrical device which reduces and converts an alternating current input voltage to a direct current output voltage. More particularly, the present invention is directed to a device which efficiently converts high voltage alternating current into a lower voltage direct current for use in a dual input voltage CATV settop terminal or other electronic apparatus.

2. Description of the Prior Art

Nearly all electronic circuits today require one or more sources of stable dc voltage. The most common method to perform a voltage transformation function is using a magnetic mutual coupling or transformer to transform an alternating current impressed on a primary winding and using the magnetic circuit to induce a reduced or increased alternating current on a secondary winding. The secondary voltage is then rectified to produce a dc voltage.

Another popular method is to use a switching regulator. The advantage of the switching regulator over a conventional voltage transformer is that very little power dissipation occurs. The active switching element used in a switching power supply is either completely energized exhibiting a low conducting voltage drop or completely deenergized. Both of these attributes cause little power dissipation making the power supply inherently efficient. Switching regulators can also be coupled directly from a rectified power line with no ac power transformer. Switching regulators typically are small, lightweight and efficient dc power supplies.

Switching power supplies and power supplies relying on transformers, however, have associated problems. The most notable problem in switching power supplies is the manifestation of noise both in the power supply output and that induced back into the power source due to a high switching frequency. Furthermore, as the input voltage increases, an additional burden is placed on the individual component specifications used in the switching power supply. For power supplies using conventional transformers, higher input voltage levels typically require a more robust transformer construction yielding heavier weight, more steel and additional windings to perform the voltage transformation.

To use either of these methods of power conversion in an electrical apparatus that is manufactured to meet the demands of a worldwide market, the power supply must have an adjustable input since the input voltage level may vary in dependance upon a particular country where the device is sold. In the United States, the ac mains power supply is 60 cycles, 120 Vac. However, in other countries the frequency may vary to 50 cycles and the input voltage level may be as high as 240 Vac. For a particular manufacturer to design and build an electronic device to meet these demands, a compromise must be made in terms of expense and performance to meet the dual voltage input requirement. To design a dual input voltage power supply with either of the above methods leads to undesirable limitations.

It is therefore desirable to find a new power conversion technique for electrical devices that obviates a heavy and expensive transformer while ameliorating the negative attributes of a switching power supply. Accordingly, there is a need for a voltage device which is inexpensive, highly efficient, and manifests little undesirable interference while performing voltage conversion.

SUMMARY OF THE INVENTION

The present invention converts a high voltage ac input source into a lower voltage dc output particularly suited for CATV settop terminals with dual input voltage requirements. The invention uses the frequency of the ac input source to switch a darlington transistor pair on and off to alternately reconfigure a combination of storage capacitors and blocking diodes to perform energy storage and effect voltage division. The dc output voltage of the circuit will be approximately one half of the peak ac input source voltage at no load.

Accordingly, it is an object of the present invention to provide a means for reducing a high voltage, ac power source into a lower voltage, dc output supply at one half of the peak input voltage.

It is a further object of the invention to provide an inexpensive and simple means for reducing the rectified dc output of a high voltage ac input source by 50% for use in CATV settop terminals or other electrical apparatus which require a dual source voltage input.

Further objects and advantages of the invention will become apparent to those of ordinary skill in the art after reading the detailed description of the preferred embodiment.

DESCRIPTION OF THE PREFERRED EMBODIMENTS

Figure 1:
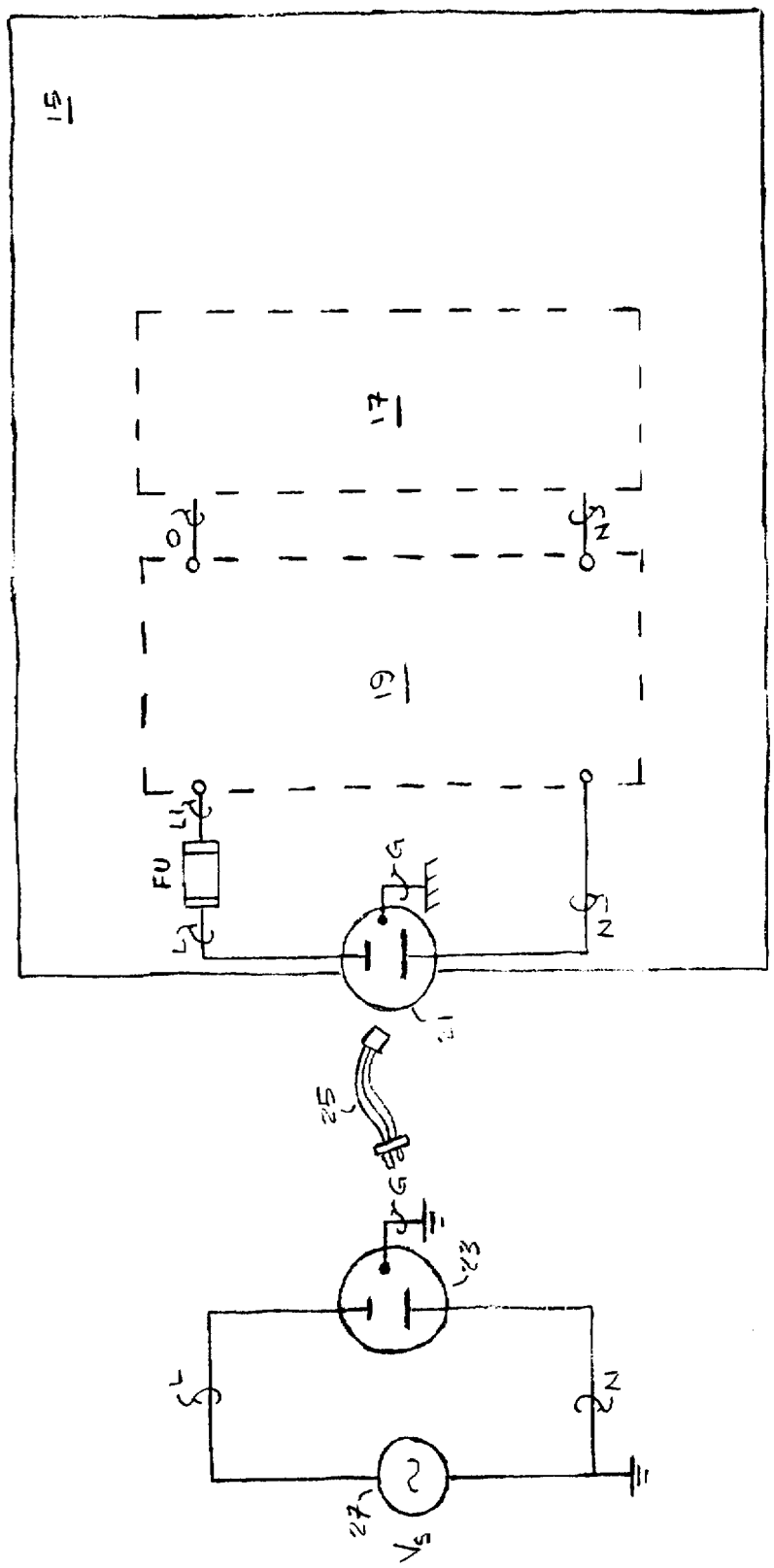
FIG. 1 is a block diagram of a dual input voltage CATV settop terminal incorporating the present invention.

The present invention is described with reference to the drawing figures where like numerals represent like elements throughout.

Shown in FIG. 1 is a CATV settop terminal 15 employing a conventional single input voltage power supply 17 in series with the present invention 19. The CATV settop terminal 15 may process a plurality of audio, video and data programs conveyed separately over a coaxial cable or other means (not shown). The function of the CATV settop terminal 15 does not require discussion and is beyond the scope of the present invention. For operation, the CATV settop terminal 15 requires a source of power. One external connection 21 of the CATV settop terminal 15 provides a connection to a utility receptacle 23 over a 3 conductor cable 25. As shown in FIG. 1, an ac mains power supply 27 provides the power for the CATV settop terminal 15 functions. The ac mains power supply 23 is typically accessible in a subscriber's home via the 3-prong female utility receptacle 23 having a line (black) connection L, a neutral (white) connection N and an earth (green) connection G. To connect the settop terminal 15 or other electronic apparatus (not shown) to the receptacle 23 requires the 3 conductor cable 25 which is either permanently connected to the settop terminal 15 or is detachable usually having an IEC 3-prong female connection molded onto one end of the cable 25 to mate with an IEC 3-prong male chassis-mounted connector 21 on the settop terminal 15. The mating connector at the utility receptacle 23 depends upon the country of use. Within the settop terminal, a fuse FU is provided to protect the household wiring in the unlikely event of a short circuit.

Figure 2:
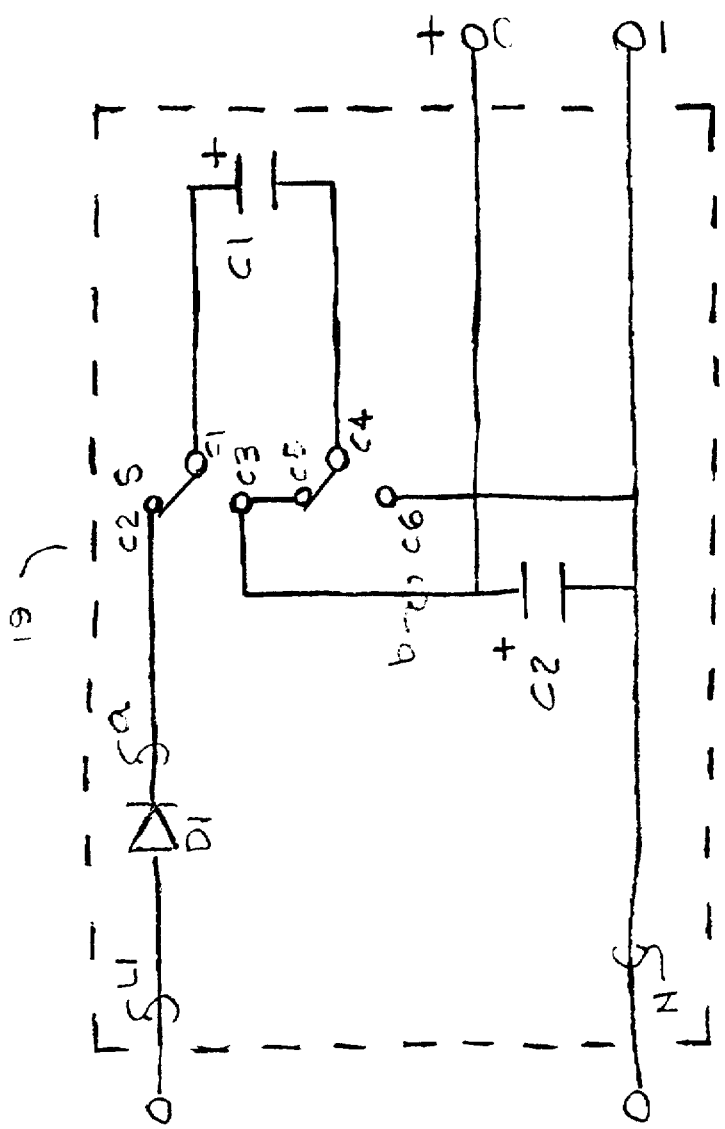
FIG. 2 is a simplified electrical schematic of the present invention with mechanical switches represented shown in a charging position.
Figure 3:
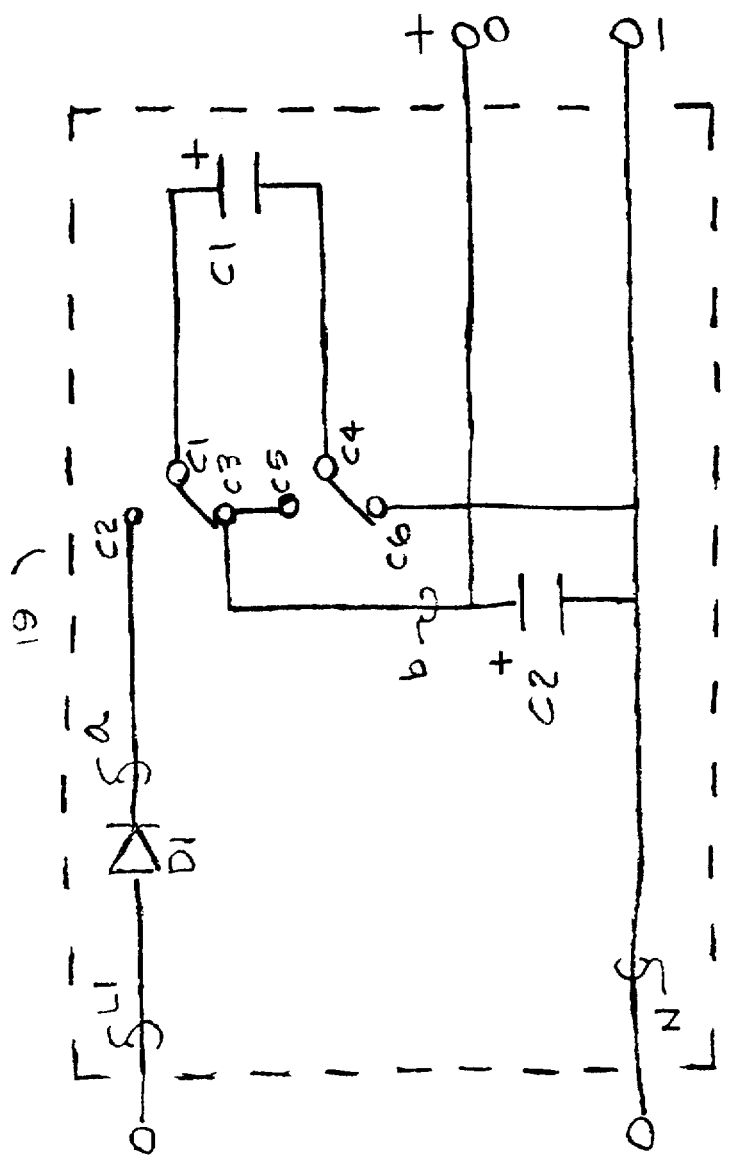
FIG. 3 is a simplified electrical schematic of the present invention with mechanical switches represented shown in a discharging position.
Figure 4:
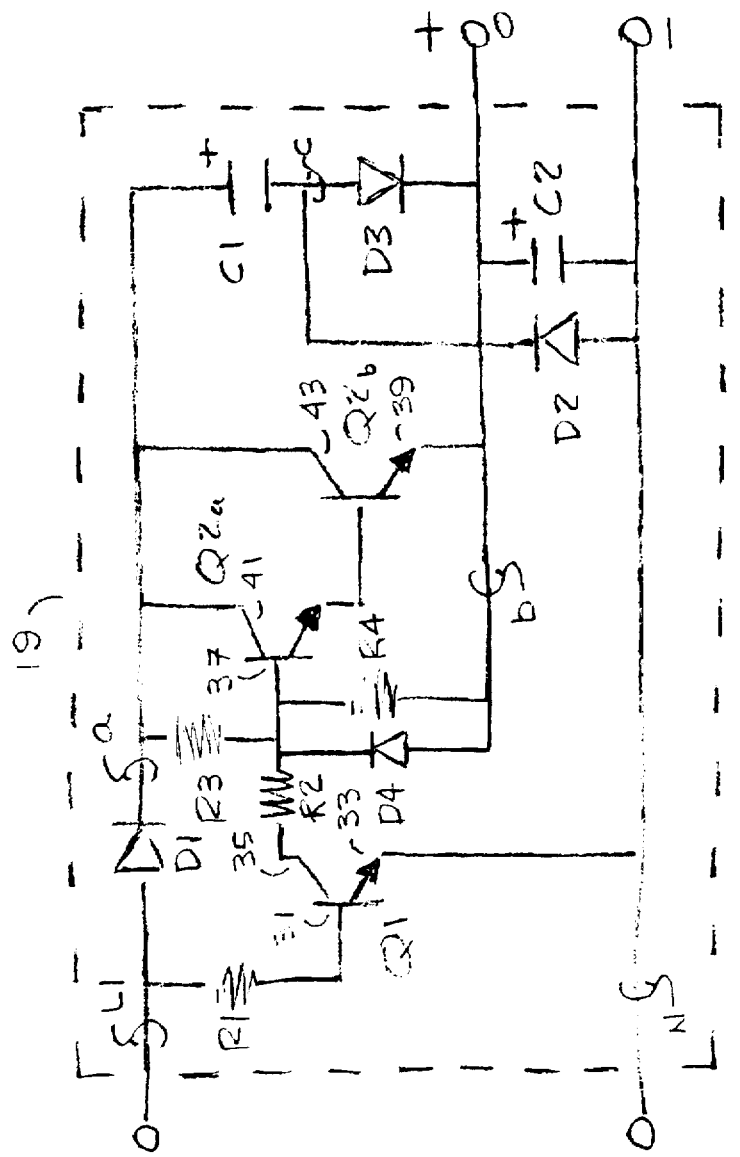
FIG. 4 is an electrical schematic of the present invention showing the preferred embodiment.

Electrical schematics illustrating the dc voltage converter 19 of the present invention are shown in FIGS. 2–4. The dc voltage converter 19 is located within a power supply section of the settop terminal or other electrical device (not shown) which requires a voltage reduction from an ac mains power supply and rectification to dc. Simplified diagrams showing the charging and discharging cycles of the voltage converter 19 are shown in FIGS. 2–3 respectively.

Referencing FIG. 2, the simplified voltage converter 19 includes a first and second capacitor, C1, C2, one blocking diode D1, and a double-pole double-throw (DPDT) switch S. A first set of form-c contacts c2, c1, c3 and a second set of form-c contacts c5, c4, c6 of the switch S alternately reconfigure the circuit from a capacitor charging mode shown in FIG. 2 to a capacitor discharging mode shown in FIG. 3. Those familiar with this art recognize that the isolated form-c contacts for each respective pole of the switch S transition simultaneously.

Figure 6A:
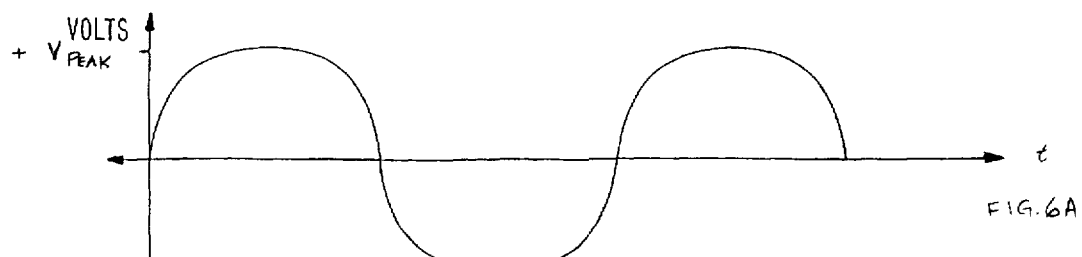
FIG. 6A is a plot of the voltage measured across nodes L1–N.
Figure 6B:
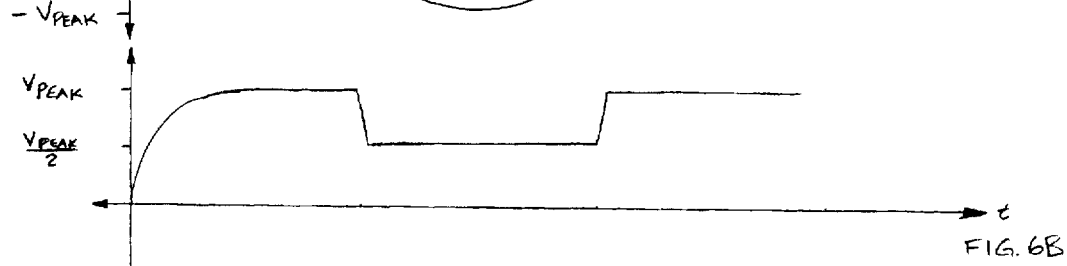
FIG. 6B is a plot of the voltage measured across nodes a–N.
Figure 6C:
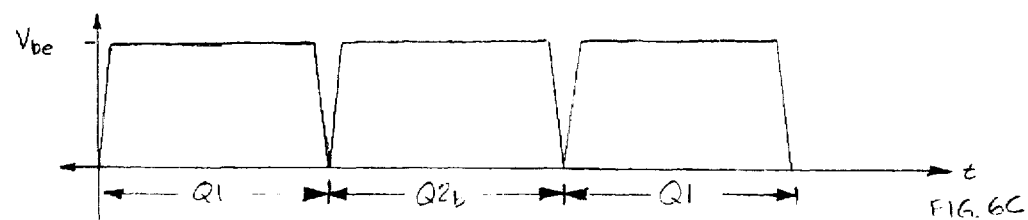
FIG. 6C is a plot of the voltage $V_{be}$ measured across the first transistor Q1 and the second darlington transistor $Q2_b$.
Figure 6D:
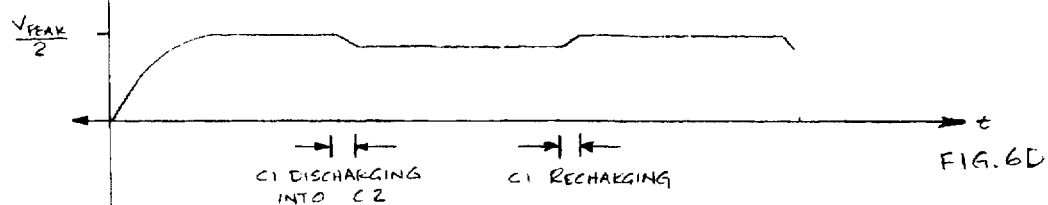
FIG. 6D is a plot of the voltage across the first capacitor C1.

Referring back to FIG. 2, at node a, the blocking diode D1 rectifies the high voltage ac source 23 (shown in FIG. 6A) input into a dc voltage (shown in FIG. 6B). When the converter 19 is charging, the first set of form-c contacts c2–c1 of the switch S couple the cathode of the blocking diode D1 to the positive terminal of the first capacitor C1. The second set of form-c contacts c5–c4 couple the negative terminal of the first capacitor C1 to a common node b formed by the positive terminal of the second capacitor C2 and the positive output O of the converter 19. The charging period of the first and second capacitors C1, C2 is determined by the line frequency and is defined by the positive portion of the alternating current cycle (shown in FIG. 6D). The blocking diode D1 effects the charging of the first and second capacitors C1, C2. It is well known to those skilled in the electronics arts that in a dc circuit, capacitors coupled in series block current, each having a portion of the total voltage impressed across each capacitor while capacitors in parallel have equal voltages. Therefore, if the contacts of the switch S are never broken, the first capacitor C1 would charge to capacity and ultimately block any current output.

Figure 6E:
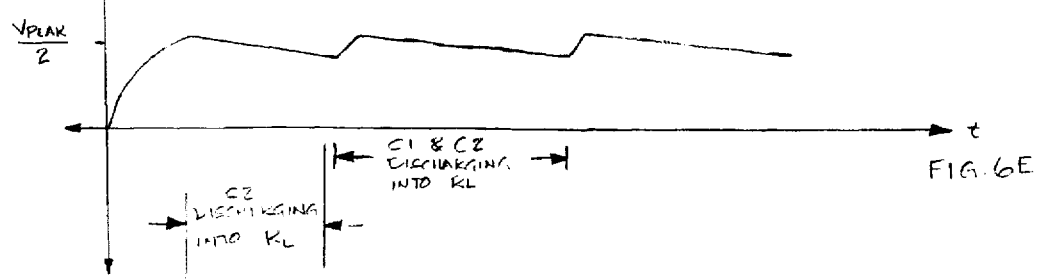
FIG. 6E is a plot of the voltage across the second capacitor C2.
Figure 1:
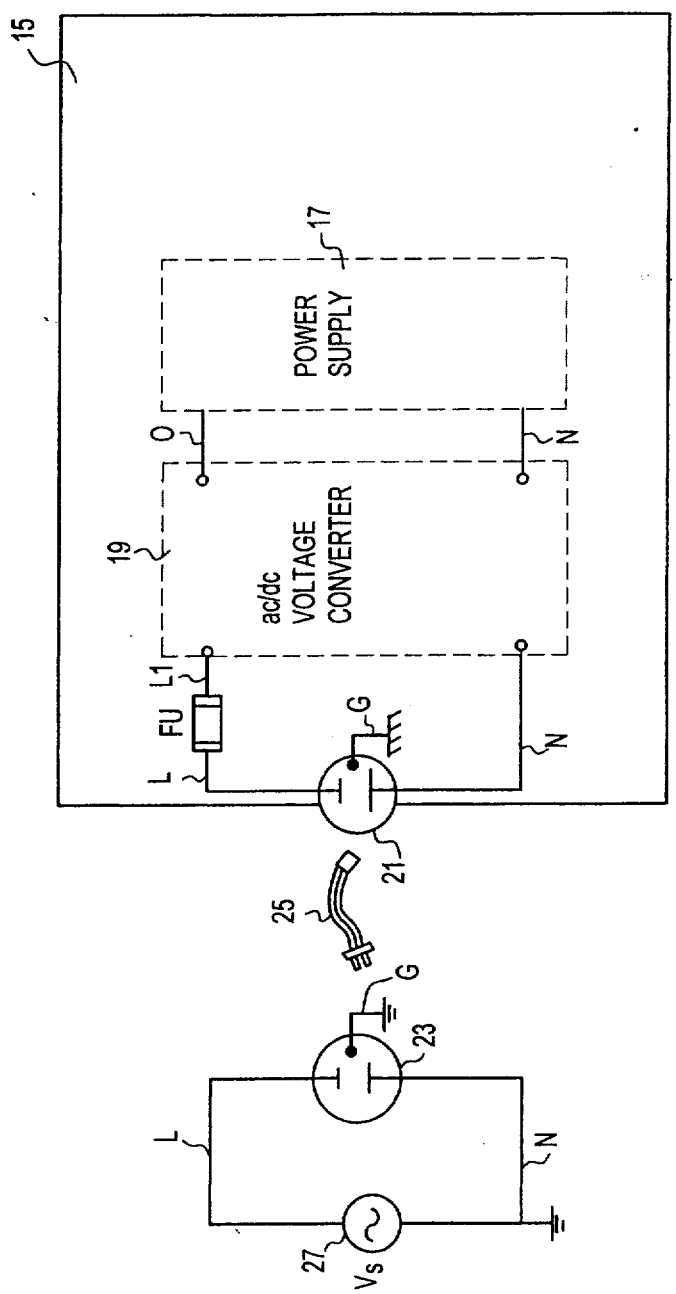
Figure 2:
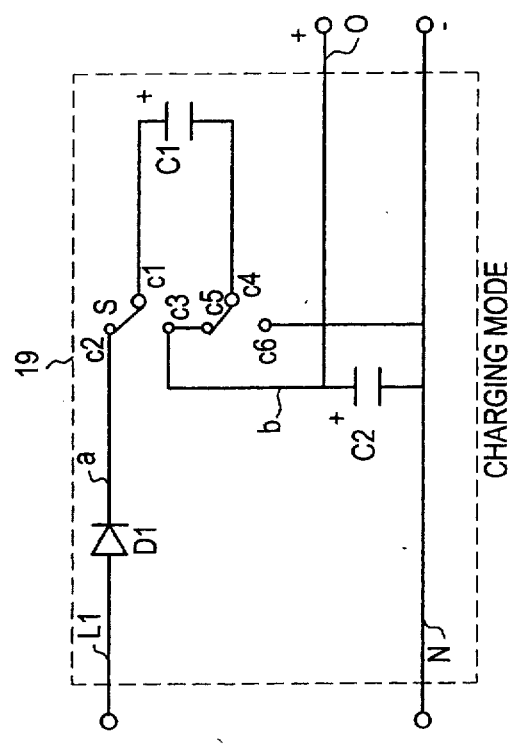
Figure 3:
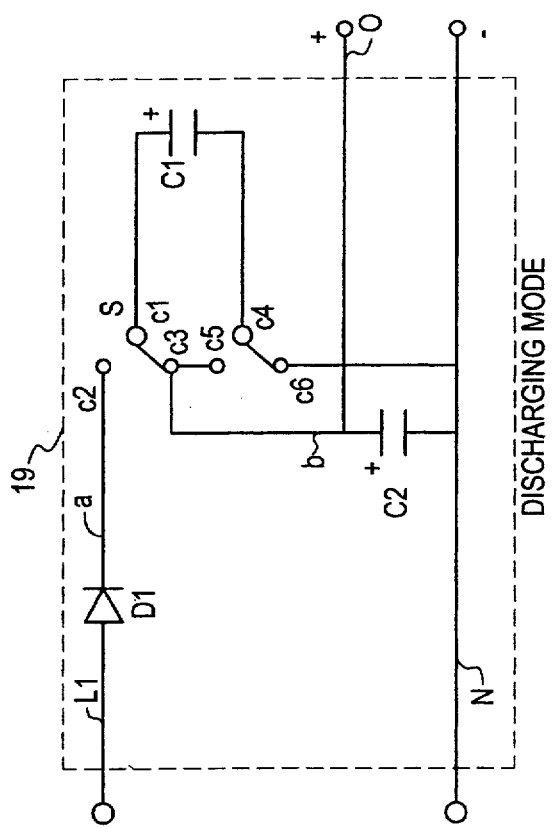
Figure 4:
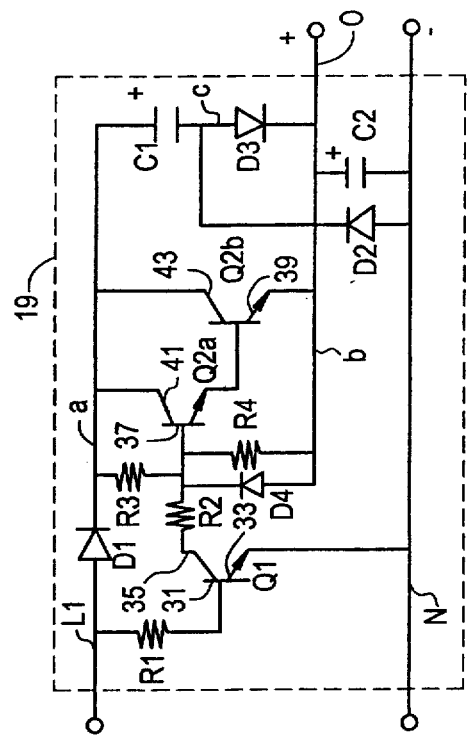
Figure 5:
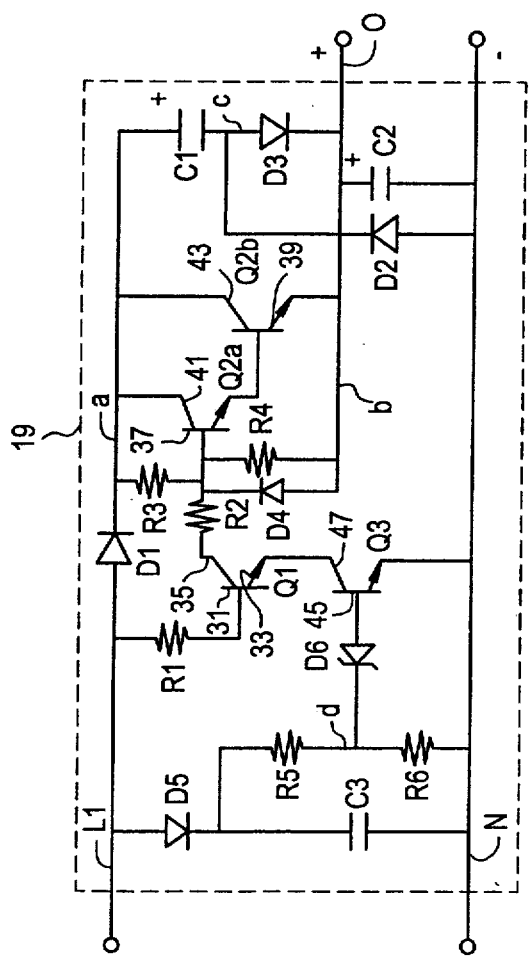
Figure 6A:
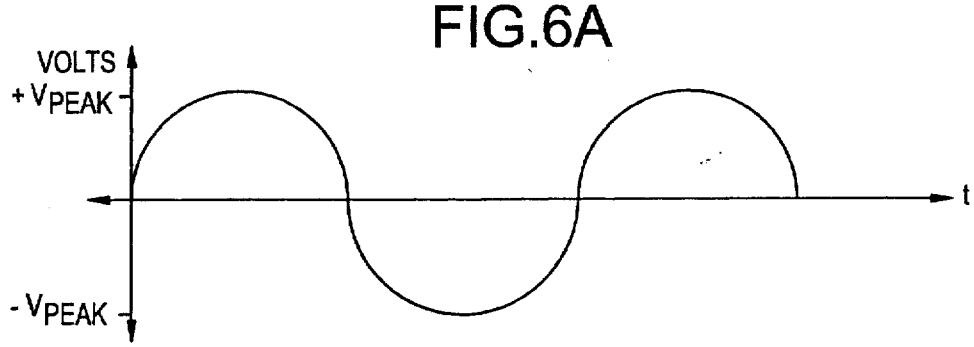
Figure 6B:
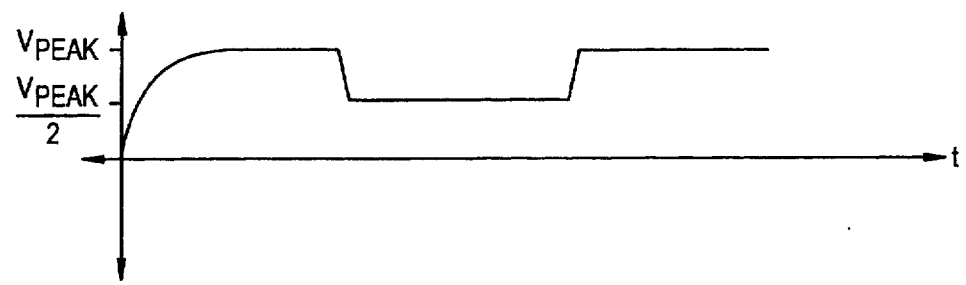
Figure 6C:
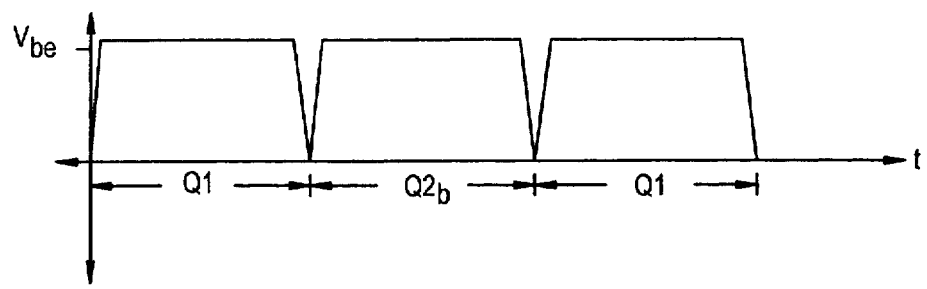
Figure 6D:
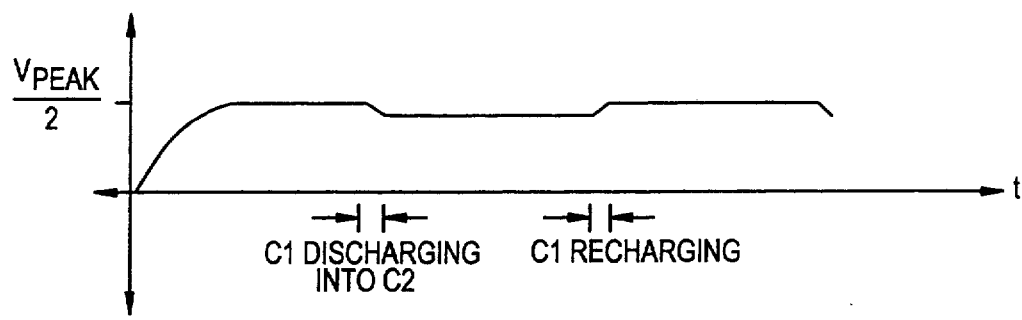
Figure 6E:
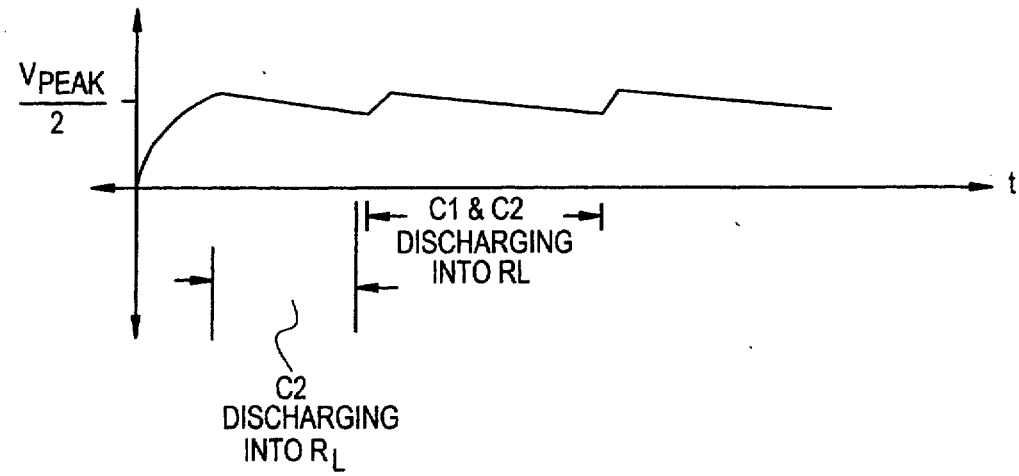
Figure 1:
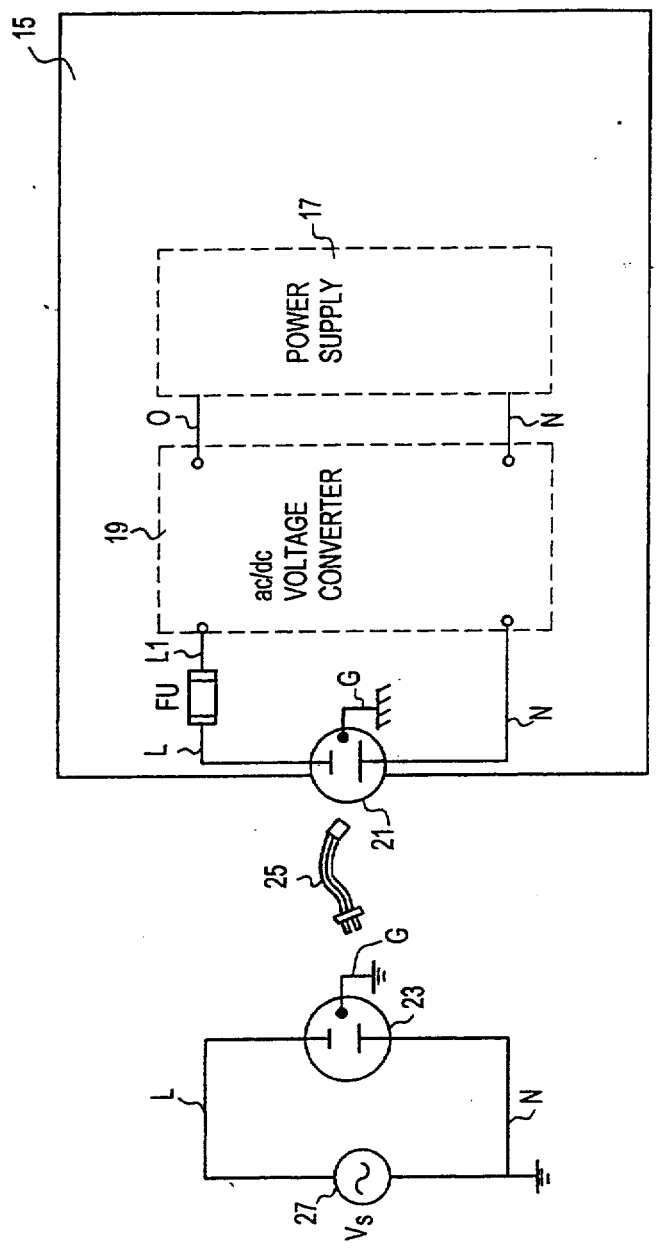
Figure 2:
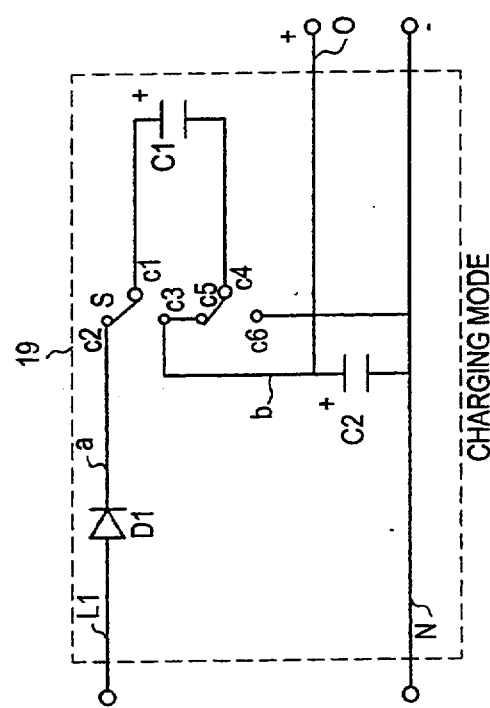
Figure 3:
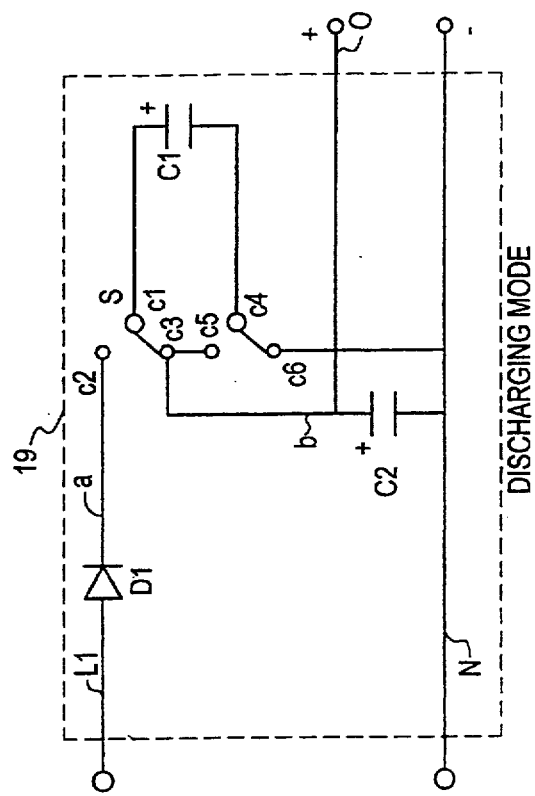
Figure 4:
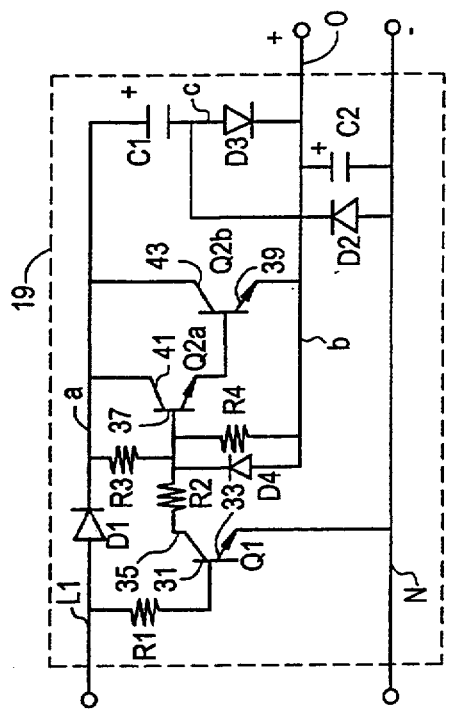
Figure 5:
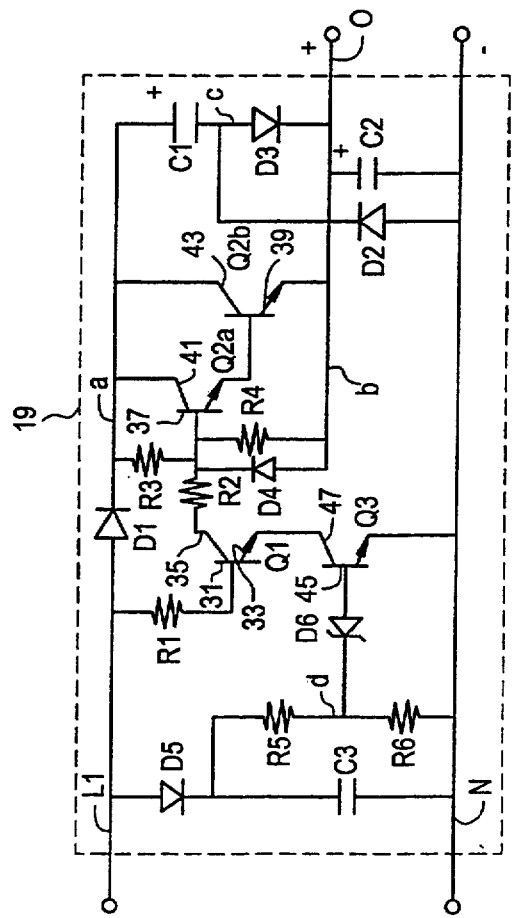
Figure 6A:
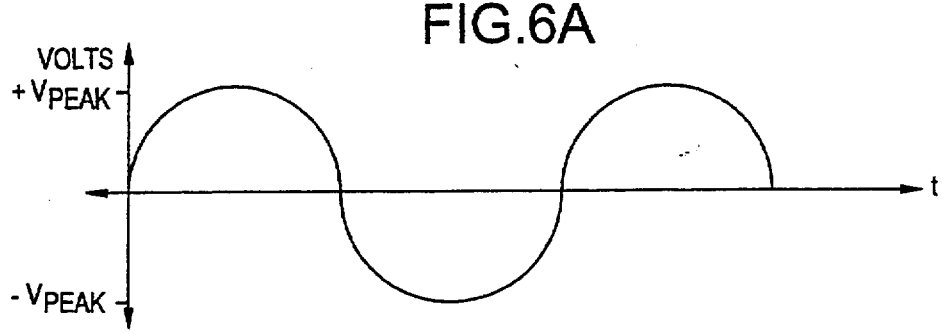
Figure 6B:
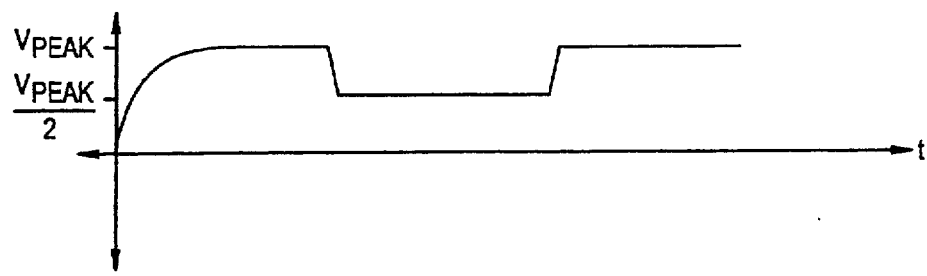
Figure 6C:
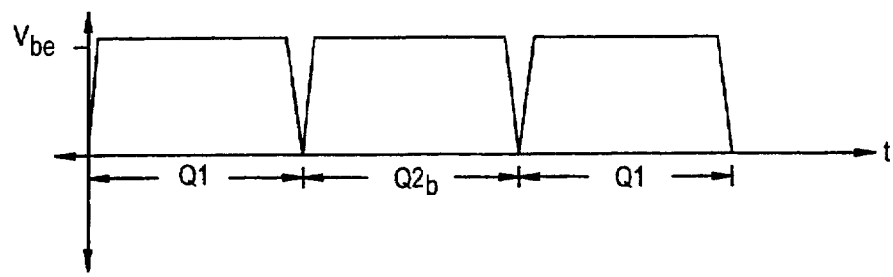
Figure 6D:
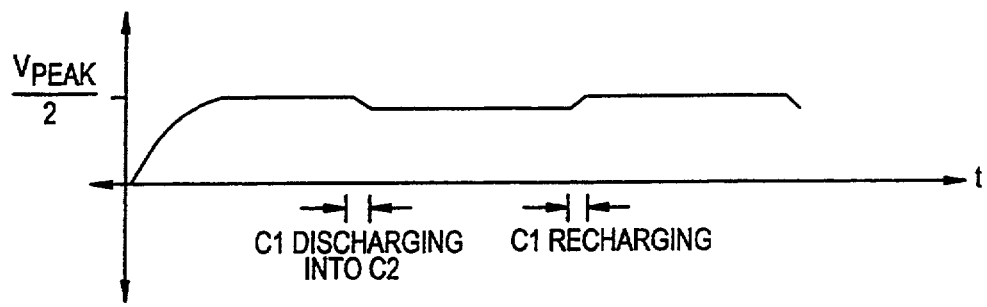
Figure 6E:
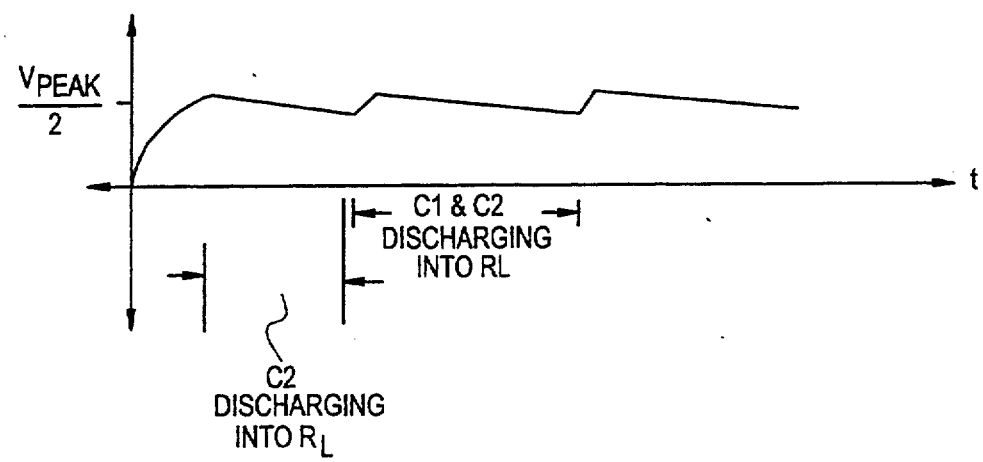

Referring now to FIG. 3, at the ac zero crossing, the form-c contacts of the switch S transition, reconfiguring the circuit for the duration of the negative half of the alternating current cycle (shown in FIG. 6A). The first set of form-c contacts c1–c3 couple the positive terminal of the first capacitor C1 with the positive terminal of the second capacitor C2. The second set of form-c contacts c4–c6 ground the negative terminal of the first capacitor C1 thereby placing the first and second capacitors C1, C2 in parallel, discharging the first capacitor C1 into the second capacitor C2 and producing a continuous filtered, dc output O to downstream regulation 17 or a load $R_L$ (shown in FIG. 6E). The moment of switching occurs at each zero crossing of the ac mains power supply 23 waveform.

The preferred embodiment of the present invention is shown in FIG. 4. The preferred embodiment replicates and automates the switching function of the mechanical switch S by adding to the circuit a second and third blocking diode D2, D3 and a high speed, high current, npn darlington transistor pair formed by a first and second transistor $Q2_a$, $Q2_b$. To control the switching of the darlington pair $Q2_a$, $Q2_b$, a first small signal npn transistor Q1 along with a first current limiting resistor R1 coupled to the base 31 of the small signal transistor Q1 monitors the ac zero crossing by coupling the small signal transistor R1 and the emitter 33 of the first transistor Q1 across the input terminals L1, N. The collector 35 of the small signal transistor Q1 is coupled to the base 37 of the first darlington transistor $Q2_a$ through a second current limiting resistor R2. The small signal transistor Q1 is turned-on and sinks current through a third resistor R3 during the positive portion of the input waveform (shown in FIGS. 6B and 6C). During the negative portion of the input waveform, the small signal transistor Q1 is turned-off (shown in FIGS. 6B and 6C).

The darlington transistor pair $Q2_a$, $Q2_b$ when turned-on effectively reconfigures the circuit by shorting the series combination of the first capacitor C1 and the third blocking diode D3. To improve switching speed, a fourth resistor R4 is coupled between the base 37 of the first darlington transistor $Q2_a$ and the emitter 39 of the second darlington transistor $Q2_b$. To prevent emitter 39 breakdown of the darlington transistors $Q2_a$, $Q2_b$, a fourth diode D4 is placed in parallel across the fourth resistor R4. A third current limiting resistor R3 is coupled between the common node a formed by both collectors 41, 43 of the darlington transistor pair $Q2_a$, $Q2_b$, the cathode of the first blocking diode D1 and the positive terminal of the first capacitor C1 to the base 37 of the first darlington transistor $Q2_a$. The cathode of the second blocking diode D2 is connected to a common node c formed by the negative terminal of the first capacitor C1 and the anode of the third blocking diode D3. The cathode of the third blocking diode D3 is connected to the common node b coupling the speed-up resistor R4, the emitter 39 of the second darlington transistor $Q2_b$ and the positive terminal of the second capacitor C2 forming the positive output O of the converter 19. Coupled to the common input/output bus N is the emitter 33 of the small signal transistor Q1, the anode of the second blocking diode D2 and the negative terminal of the second capacitor C2.

The preferred embodiment as shown in FIG. 4 operates similarly to the simplified charging mode shown in FIG. 2 and the simplified discharging mode in FIG. 3. For each cycle of the ac source line frequency, the small signal transistor Q1 turns-on and turns-off. The cyclical turning on and off of the small signal transistor Q1 controls the darlington transistor pair $Q2_a$, $Q2_b$ which conversely reconfigures the circuit to allow the first and second capacitors C1, C2 to be charged during the positive portion of the ac waveform by the halfwave rectification of the first blocking diode D1. During the negative portion of the ac waveform at which small signal transistor Q1 is turned-off and the darlington transistor pair $Q2_a$, $Q2_b$ are turned-on, the first capacitor C1 discharges into the second capacitor C2 thereby providing a continuous filtered dc output O to the load $R_L$.

During the positive half of the alternating current cycle (shown in FIG. 6A), the first diode D1 conducts. Current flows into the circuit charging the first capacitor C1, passing through the third diode D3 and charging the second capacitor C2. Since both the first and second capacitors C1, C2 are coupled in series, each capacitor receives the same charge Q, as follows:

$$Q = C_{C1} V_{C1} \text{ and} \qquad \text{Equation 1}$$

$$Q = C_{C2} V_{C2} \qquad \text{Equation 2}$$

where Q equals the charge of each capacitor in Coulombs, C equals the value of capacitance in Farads and V are the Volts impressed across each capacitor. Since the peak line voltage during the positive half of the alternating current cycle is impressed across the series combination of the first diode D1, the first capacitor C1, the third diode D3 and the second capacitor C2; if both capacitors have the same capacitance value, C, then the voltage across the series combination is divided equally by the number of capacitors. This can be shown as:

$$V_{peak} = V_{C1} + V_{C2} \qquad \text{Equation 3}$$

Substituting for $V_{C1}$ and $V_{C2}$:

$$V_{peak} = \frac{Q}{C} + \frac{Q}{C} = \frac{2Q}{C} \qquad \text{Equation 4}$$

and solving:

$$\frac{V_{peak}}{2} = \frac{Q}{C}; \text{ for each capacitor.} \qquad \text{Equation 5}$$

As discussed, during the discharging mode, the first capacitor C1 discharges into the second capacitor C2 and the load $R_L$. The dc voltage across the second capacitor C2 will be approximately one half of the peak ac input voltage, $V_{peak}$ as long as the capacitance values of the first capacitor C1 and the second capacitor C2 are equal.

The capacitance of the first capacitor C1 may be slightly less than or equal to the capacitance of the second capacitor C2 so the voltage experienced during initial energization does not exceed $V_{peak}/2$. If the capacitance of the first capacitor C1 is greater than the capacitance of the second capacitor C2, the initial energization transient may produce a voltage greater than $V_{peak}/2$ across the second capacitor depending upon the load $R_L$. After the present invention 19 has been in operation for several cycles, the voltage stabilizes at $V_{peak}/2$.

Figure 5:
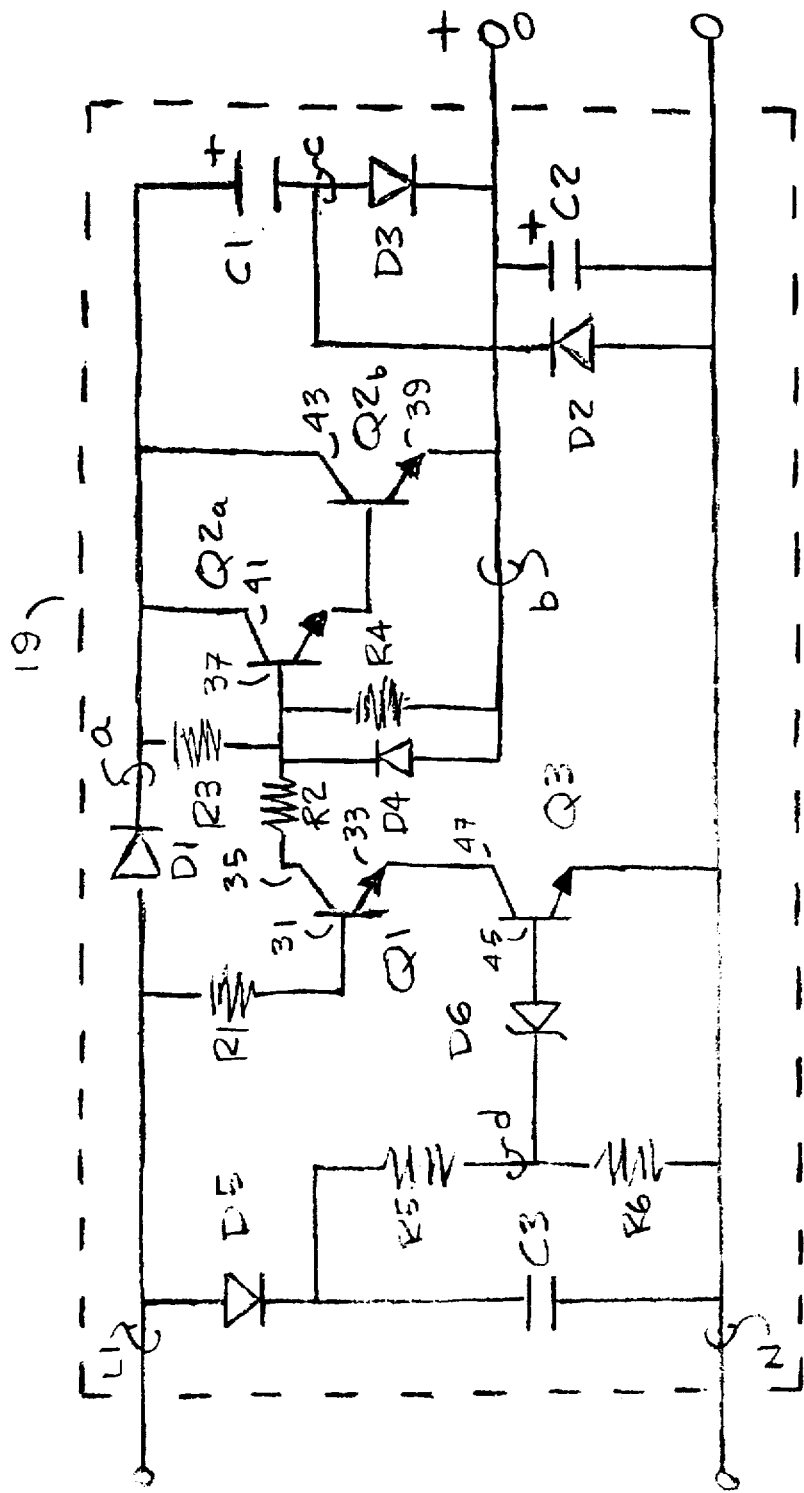
FIG. 5 is an electrical schematic of the present invention showing an alternative embodiment.

An alternative embodiment for the present invention 19 is shown in FIG. 5. A voltage monitoring circuit is added to the above described circuit. The voltage monitoring circuit includes a fifth diode D5 coupled in series with a third capacitor C3. The series combination is coupled across the line and neutral inputs L1, N with the anode of the fifth diode D5 coupled to the line L1 input. A voltage divider having a fifth resistor R5 coupled in series with a sixth resistor R6 is connected in parallel across the third capacitor C3 to create a calculated voltage drop depending on the input voltage. The cathode of a regulating fifth Zener diode D5 is coupled to the common node d formed between the fifth and sixth resistors R5, R6 and having the anode coupled to the base 45 of a third npn transistor Q3. For this embodiment, the value of the Zener diode D6 is 10 V. Other Zener values will function with the proper fifth to sixth resistor R5, R6 ratio. The collector 47 of the third transistor Q3 interrupts the emitter 33 of the small signal transistor Q1. The emitter 49 of the third transistor is coupled to the circuit common N.

If the input voltage is less than 125 Vac or 130 $V_{RMS}$, the dc voltage across the third capacitor C3 will be approximately 184 Vdc or less. The voltage divider formed by the fifth and sixth resistors R5, R6 drops approximately 10 Vdc across the sixth resistor R6 producing approximately 174 Vdc across the fifth resistor R5. The third transistor Q3 will remain off if the input voltage supply 27 is 130 $V_{RMS}$ or less thereby preventing the small signal transistor Q1 from turning-on which keeps the darlington pair $Q2_a$, $Q2_b$ fully on maintaining the circuit as a halfwave rectifier. For input voltages greater than 130 $V_{RMS}$, the third transistor Q3 turns-on and permits the circuit to operate as described earlier.

While the present invention has been described in terms of the preferred embodiment, other variations which are within the scope of the invention as outlined in the claims below will be apparent to those skilled in the art.

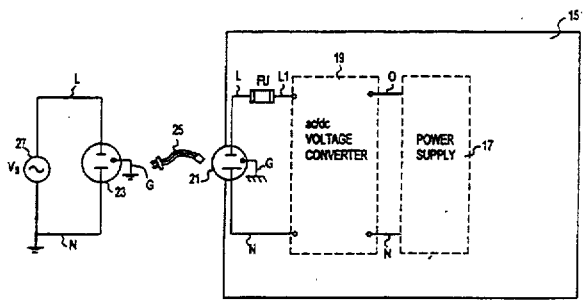

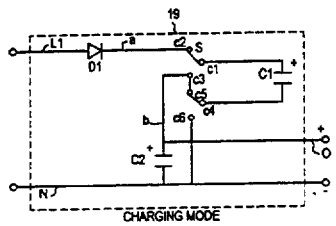

What is claimed is:

1. A voltage converter circuit for selectively converting alternating current from an alternating current power supply having a line and a neutral to direct current comprising:

a first ac input for coupling with the line of the ac power supply;

a second ac input for coupling with the neutral of the ac power supply;

a positive dc output;

a negative dc output directly coupled to said second ac input;

a rectifier directly coupled to said first ac input;

a first and second capacitor selectively coupled to said dc outputs;

said second capacitor coupled across said dc output; and a switch for coupling said first capacitor with said rectifier in a first state wherein said first capacitor is serially coupled to said second capacitor and for coupling said first capacitor in parallel with said second capacitor in a second state.

2. The apparatus of claim 1 wherein said switch is responsive to the ac power supply.

3. The apparatus of claim 2 wherein said first state is defined as the ac power supply positive half-cycle and said second state is defined as the ac power supply negative half-cycle.

4. The apparatus of claim 3 wherein said switch comprises a first and second switch.

5. The apparatus of claim 4 wherein said first switch comprises:

first and second current limiting resistors serially coupled at a first electrical node, said first resistor coupled to a second electrical node at said rectifier and said second resistor coupled to said positive output;

a protection diode having a cathode coupled to said first electrical node and an anode coupled to said positive output; and said first electrical node coupled to the base of a darlington transistor.

6. The apparatus of claim 5 wherein said second switch comprises:

a third current limiting resistor having a first terminal coupled to the line of the ac power supply and a second terminal;

a first small signal transistor having a base, emitter, and collector, said base of said first transistor coupled to said second terminal of said third current limiting resistor, said emitter coupled to said negative dc output, and said collector coupled to a first terminal of a fourth current limiting resistor; and said fourth current limiting resistor having a second terminal coupled to said first electrical node.

7. The apparatus of claim 6 further comprising a voltage monitor responsive to input voltages greater than a preselected level which inhibits operation of said switch.

8. A voltage converter circuit for selectively converting alternating current from an alternating current power supply having a line and a neutral to direct current for use in a cable television settop terminal comprising:

a first ac input for coupling with the line of the ac power supply;

a second ac input for coupling with the neutral of the ac power supply;

a positive dc output;

a negative dc output directly coupled to said second ac input;

a rectifier directly coupled to said first ac input;

a first and second capacitor selectively coupled to said dc outputs;

said second capacitor coupled across said dc output; and a switch for coupling said first capacitor with said rectifier in a first state wherein said first capacitor is serially coupled to said second capacitor and for coupling said first capacitor in parallel with said second capacitor in a second state.

9. The apparatus of claim 8 wherein said switch is responsive to the ac power supply.

10. The apparatus of claim 9 wherein said first state is defined as the ac power supply positive half-cycle and said second state is defined as the ac power supply negative half-cycle.

11. The apparatus according to claim 10 wherein said switch further comprises a first and second switch.

12. The apparatus according to claim 11 wherein said first switch comprises:

first and second current limiting resistors serially coupled at a first electrical node, said first resistor coupled to a second electrical node at said rectifier and said second resistor coupled to said positive output;

a protection diode having a cathode coupled to said first electrical node and an anode coupled to said positive output; and said first electrical node coupled to the base of a darlington transistor.

13. The apparatus of claim 12 wherein said second switch comprises:

a third current limiting resistor having a first terminal coupled to the line of the ac power supply and a second terminal;

a first small signal transistor having a base, emitter, and collector, said base of said first transistor coupled to said second terminal of said third current limiting resistor, said emitter coupled to said negative dc output, and said collector coupled to a first terminal of a fourth current limiting resistor; and said fourth current limiting resistor having a second terminal coupled to said first electrical node.

14. A voltage converter for connecting an alternating current source comprising:

a rectifier;

first and second capacitors;

said second capacitor coupled directly across dc outputs; and a switch for coupling said first capacitor with said rectifier in a first state wherein said first capacitor is serially coupled to said second capacitor and for coupling said first capacitor in parallel with said second capacitor in a second state.

15. The apparatus of claim 14 wherein said switch provides voltage across said series coupling of said first and second capacitors during said first state.

16. The apparatus of claim 15 wherein said switch interrupts current to said parallel coupling during said second state.

17. The apparatus of claim 16 wherein said first state is defined as the ac power supply positive half-cycle and said second state is defined as the ac power supply negative half-cycle.

18. The apparatus of claim 17 further comprising a voltage monitor responsive to input voltages greater than a preselected level which inhibits operation of said switch.

19. A voltage converter for use in a CATV settop terminal for connecting an alternating current source comprising:

a rectifier;

first and second capacitors;

said second capacitor coupled directly across dc outputs; and a switch for coupling sai ' first capacitor with said rectifier in a first state wherein said first capacitor is serially coupled to said second capacitor and for coupling said first capacitor in parallel with said second capacitor in a second state.

20. The apparatus of claim 19 wherein said switch provides voltage across said series coupling of said first and second capacitors during said first state.

21. The apparatus of claim 20 wherein said switch interrupts current to said parallel coupling during said second state.

22. The apparatus of claim 21 wherein said first state is defined as the ac power supply positive half-cycle and said second state is defined as the ac power supply negative half-cycle.

23. The apparatus of claim 22 further comprising a voltage monitor responsive to input voltages greater than a preselected level which inhibits operation of said switch.

* * * * *

UNITED STATES PATENT AND TRADEMARK OFFICE
CERTIFICATE OF CORRECTION

PATENT NO. : 5,914,869

DATED : 09/15/97

INVENTOR(S) :. Timothy J. Lubecki

It is certified that error appears in the above-identified patent and that said Letters Patent is hereby corrected as shown below:

The Title page, showing an illustrative figure, should be deleted and subtitute therefor the attached title page.

Delete drawing sheets 1-7 and substitute therefore the drawing sheets, consisting of figs. 1-6E.

Signed and Sealed this

Twenty-second Day of August, 2000

*Attest:*

Q. TODD DICKINSON

*Attesting Officer*     Director of Patents and Trademarks

United States Patent [19]

Troiano

[11] Patent Number: 5,914,869
[45] Date of Patent: Jun. 22, 1999

[54] AC/DC TRANSFORMERLESS VOLTAGE CONVERTER

[75] Inventor: Anthony Troiano, Princeton Junction, N.J.

[73] Assignee: General Instrument Corporation, Horsham, Pa.

[21] Appl. No.: 08/929,714

[22] Filed: Sep. 15, 1997

[51] Int. Cl.[6] .................................................. H02M 3/18
[52] U.S. Cl. ............................ 363/61; 320/128; 307/110
[58] Field of Search .................................. 320/128, 166; 307/109, 110; 363/56, 60, 61

[56] References Cited

U.S. PATENT DOCUMENTS 4,882,665 11/1989 Choi et al. ............................ 363/60
5,187,421 2/1993 Naito .................................... 363/59
5,446,644 8/1995 Zhou .................................... 363/62

*Primary Examiner*—Shawn Riley
*Attorney, Agent, or Firm*—Volpe and Koenig, P.C.

[57] ABSTRACT

A voltage converter transforms a high voltage alternating current (ac) input source into a lower voltage direct current (dc) output voltage. The line frequency of the ac current switches an electronic switch to alternately reconfigure a combination of capacitors and diodes to perform energy storage and effect voltage division. The dc output voltage is approximately one half of the peak ac input voltage at no load.

23 Claims, 6 Drawing Sheets

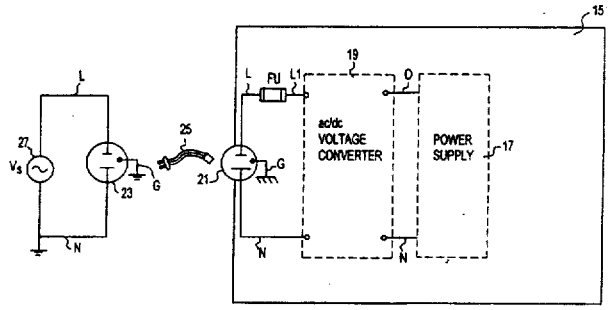

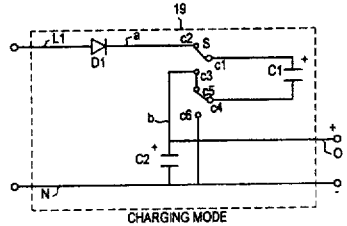
CHARGING MODE

C1 DISCHARGING INTO C2    C1 RECHARGING

C1 & C2 DISCHARGING INTO RL

C2 DISCHARGING INTO $R_L$

UNITED STATES PATENT AND TRADEMARK OFFICE
CERTIFICATE OF CORRECTION

PATENT NO. : 5,914,869

DATED : June 22, 1999

INVENTOR(S) : Anthony Troiano

It is certified that error appears in the above-identified patent and that said Letters Patent is hereby corrected as shown below:

The title page, showing an illustrative figure, should be deleted and substitute therfore the attached title page.

Delete drawing sheets 1-7 and substitute therefore the drawing sheets, sonsisting of FIGS. 1-6E.

This Certificate supercedes certificate of correction issued August 22, 2000.

Signed and Sealed this

Fourteenth Day of November, 2000

*Attest:*

Q. TODD DICKINSON

*Attesting Officer*     *Director of Patents and Trademarks*

United States Patent [19]

Troiano

[11] Patent Number: 5,914,869
[45] Date of Patent: Jun. 22, 1999

[54] AC/DC TRANSFORMERLESS VOLTAGE CONVERTER

[75] Inventor: Anthony Troiano, Princeton Junction, N.J.

[73] Assignee: General Instrument Corporation, Horsham, Pa.

[21] Appl. No.: 08/929,714

[22] Filed: Sep. 15, 1997

[51] Int. Cl.⁶ ........................................... H02M 3/18
[52] U.S. Cl. ............................ 363/61; 320/128; 307/110
[58] Field of Search .................................. 320/128, 166; 307/109, 110; 363/56, 60, 61

[56] References Cited

U.S. PATENT DOCUMENTS

| | | |
|---|---|---|
| 4,882,665 | 11/1989 | Choi et al. ............. 363/60 |
| 5,187,421 | 2/1993 | Naito ..................... 363/59 |
| 5,446,644 | 8/1995 | Zhou ..................... 363/62 |

Primary Examiner—Shawn Riley
Attorney, Agent, or Firm—Volpe and Koenig, P.C.

[57] ABSTRACT

A voltage converter transforms a high voltage alternating current (ac) input source into a lower voltage direct current (dc) output voltage. The line frequency of the ac current switches an electronic switch to alternately reconfigure a combination of capacitors and diodes to perform energy storage and effect voltage division. The dc output voltage is approximately one half of the peak ac input voltage at no load.

23 Claims, 6 Drawing Sheets